Nov. 10, 1959     F. P. FEHN     2,912,606
CONTROL CIRCUIT FOR TORQUE TRANSMITTING MECHANISM
Filed June 17, 1957     6 Sheets-Sheet 1

*INVENTOR.*
FRANK P. FEHN
BY
ATTORNEYS

Nov. 10, 1959  F. P. FEHN  2,912,606
CONTROL CIRCUIT FOR TORQUE TRANSMITTING MECHANISM
Filed June 17, 1957  6 Sheets-Sheet 2

INVENTOR.
FRANK P. FEHN

Nov. 10, 1959 F. P. FEHN 2,912,606
CONTROL CIRCUIT FOR TORQUE TRANSMITTING MECHANISM
Filed June 17, 1957 6 Sheets-Sheet 4

INVENTOR.
FRANK P. FEHN
BY
Williams & Pillsbury
ATTORNEYS

Nov. 10, 1959  F. P. FEHN  2,912,606
CONTROL CIRCUIT FOR TORQUE TRANSMITTING MECHANISM
Filed June 17, 1957  6 Sheets-Sheet 5

INVENTOR.
FRANK P. FEHN
BY
*Williams & Tilbury*
ATTORNEYS

Nov. 10, 1959  F. P. FEHN  2,912,606
CONTROL CIRCUIT FOR TORQUE TRANSMITTING MECHANISM
Filed June 17, 1957  6 Sheets-Sheet 6
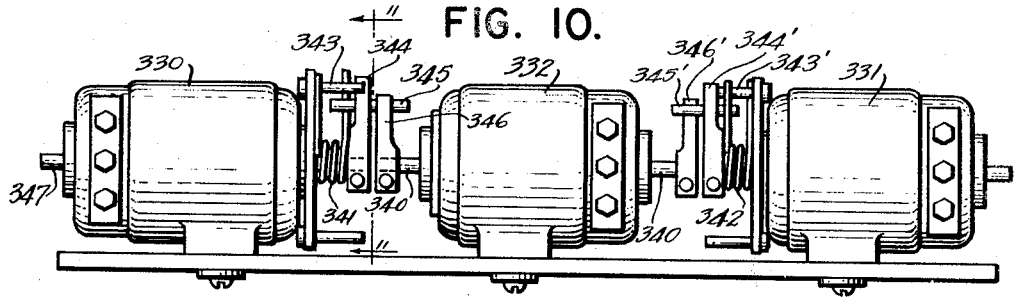
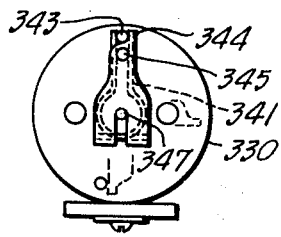
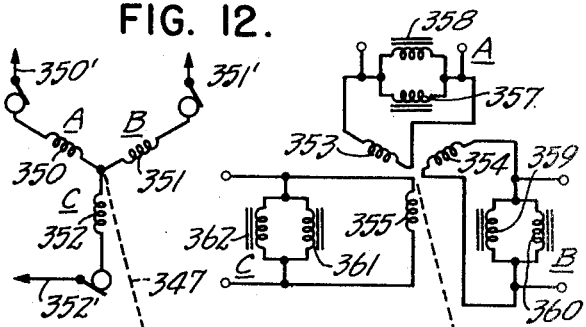
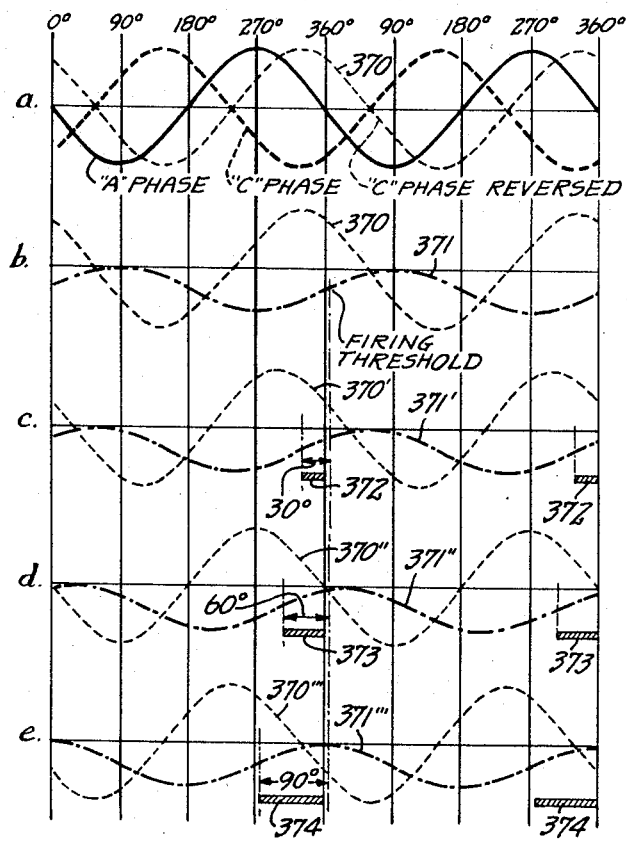
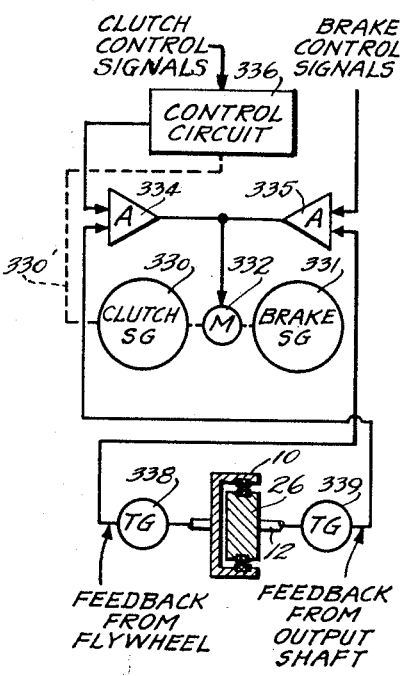
INVENTOR
FRANK P. FEHN
BY
Williams & Tilberry
ATTORNEYS United States Patent Office 2,912,606
Patented Nov. 10, 1959

2,912,606

CONTROL CIRCUIT FOR TORQUE TRANS-
MITTING MECHANISM

Frank P. Fehn, Canton, Ohio, assignor to E. W. Bliss
Company, Canton, Ohio, a corporation of Delaware Application June 17, 1957, Serial No. 666,074

25 Claims. (Cl. 310—98)

This invention relates to improvements in torque transmission and in particular to improvements in torque transmitters such as flywheel means and the like which are independent of, or are substantially less dependent on, prime movers required by conventional type flywheels. This application is a continuation-in-part of my copending application, Serial No. 527,750, filed August 11, 1955, now abandoned.

More specifically, the invention relates to flywheel-type energy-storing torque transmitting means which are self-energizing and adapted selectively to transmit torque and counter-torque to shafts and the like with which they are associated to perform useful work.

The principle of the flywheel is old and well understood, and its energy-storing characteristics are admirably suited for the operation of many types of present-day industrial machines. The flywheel and its associated mechanisms are normally utilized smoothly to translate stored flywheel energy into work producing torque of various kinds. To the accomplishment of the foregoing, heretofore it has been customary idly to mount the flywheel on a backshaft, drive shaft, or the like, which is rendered rotatable thereon by means of a prime mover such as a small electric motor, belt-connected to the outer periphery of the flywheel. Normally, clutch means are also incorporated between the shaft and the flywheel, whereby engagement may be made intermittently therebetween by air pressure, electro-magnetic forces, or the like. A mechanical brake of some commercially accepted variety is usually adapted automatically to engage the shaft to hold it against rotation whenever the clutch is de-energized to disconnect the flywheel from the shaft.

When it has been desirable to operate a machine at more than one speed, speed-reduction gear systems have been incorporated with the clutches. It is also important in some cases that machines be protected against sudden and/or unexpected overloads. To this end, special load protecting devices are known to be incorporated into the power train, such as overload clutches and the like, which will disengage under a predetermined critical load to release the flywheel torque input.

In summation, therefore, the more important accessories to the modern flywheel which are employed separately or in combination to operate certain types of heavy industrial machines include: a flywheel prime mover, a clutch, a brake, a speed-change drive means, and an overload protection device.

In view of the foregoing, it is a general object of the present invention to provide an improved and novel torque transmitting mechanism which will perform all of the functions of the mechanisms set forth in summation hereinabove, and will provide these functions with improved performance.

It is a primary and important object of the invention to provide novel means to energize the above mentioned torque transmitting mechanism wherein said mechanism is enabled to function in a superior manner to perform the tasks of the heretofore recited flywheel accessories.

Other objects of the invention include the provision of novel flywheel means which are self-energizing; the provision of a flywheel device which also functions as a clutch and brake, and yet requires no more space than a conventional flywheel; the provision of torque transmitting means which may be controlled to function as an overload protection device; the provision of a novel device adapted to provide energy conserving clutching and braking; the provision of a novel device adapted to perform the functions of a flywheel, clutch, brake and overload mechanism, in a superior manner and with a minimum of wear and maintenance; the provision of a novel combination flywheel, clutch, brake and overload device which is amenable to more precise control, which is relatively inexpensive to manufacture, and which has a minimum of mechanical wearing contact between parts; and the provision of novel means to selectively supply alternating or direct current alternatively to excitable windings of the aforesaid torque-transmitting mechanism to enable the said mechanism to function in a novel and useful manner.

To the accomplishment of the foregoing and related ends, said invention then consists of means hereinafter fully described and particularly pointed out in the claims, the annexed drawings and the following description setting forth in detail certain alternative structures embodying the invention. In said drawings:

Fig. 4A is a fragmentary circuit diagram illustrating a modification of Fig. 4;

Fig. 10 is a view in elevation of an element of the control means for the device of Fig. 3;

Fig. 11 is a sectional view, taken in the plane 11—11 of Fig. 10;

Fig. 12 is an electrical diagram illustrating the internal organization of a part of Fig. 10;

Fig. 13 is a simplified block diagram schematically showing a portion of the control means for the torque-transmitting device of Fig. 3; and Fig. 14 is a simplified group of diagrams graphically illustrating theoretical voltage-time developments for one type of control for the basic control circuits of Figs. 4, 5, and 9.

Figure 3:
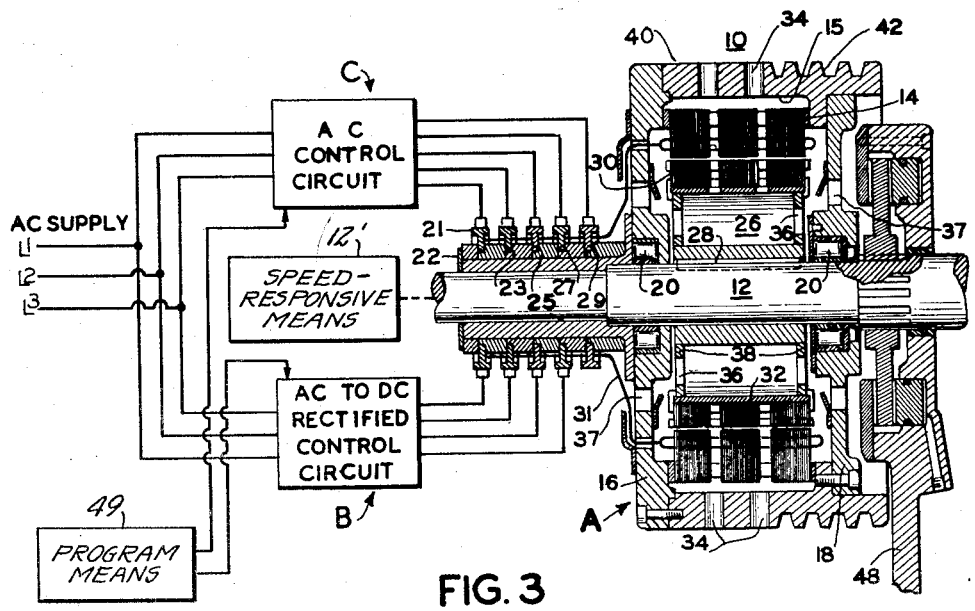
Fig. 3 is an enlarged sectional view taken substantially on the line 3—3 of Fig. 2, to illustrate the internal structure of the embodiment of Fig. 1, and to show schematically the means for supplying current to a preferred embodiment of the invention.

Reference is now made to the drawings in greater detail and in particular to Fig. 3.

A preferred embodiment of the invention comprises; torque transmitting means A including an outer rotatable member 10 which is idly journaled on a shaft 12. Hereinafter the outer rotatable member 10 will be referred to as the outer member. The outer member is hollow and is provided with electric current conducting excitable windings 14 secured to the side members 16 and 18 adjacent to its inner periphery 15. The means for journaling the outer member 10 on the shaft 12 comprises a pair of side members 16 and 18 secured to opposite sides of the outer member and mounted on anti-friction bearings 20 carried on the shaft 12. An extension of the right end of the shaft 12 (Fig. 3) is intended to be suitably connected to any work performing device. The left end of the shaft is provided with a sleeve 22 to carry a plurality of electric current collector rings 21, 23, 25, 27 and 29 thereabout. Although five collector rings are shown in Fig. 3, other numbers may be employed to supply the electrical current requirements for the device depending on the particular circuits employed.

An inner rotatable member 26, hereinafter referred to as the inner member, is integrally secured to the shaft 12 by key means 28, or the like, to rotate concentrically within the outer member 10. The inner member 26 is provided with electrical induction windings 30 about its outer periphery 32, the preferred windings on this member being of the squirrel cage variety. Air passages 34 are suitably provided in the outer periphery 40 of the outer member 10, and air holes 36 and 37 are provided in the side walls 38, 16, and 18, respectively, for cooling purposes. The outer periphery 40 of the outer member 10 is provided with V-belt grooves 42 for driving connection to a pulley 44 of an electric motor prime mover source 46 (see Fig. 2).

Although, as set forth hereinabove, the outer member 10 is seen to be the driving member and the inner member 26 is seen to be the driven member, it will be understood that the driving and driven relationship of these members may be reversed without departing from the scope of the invention. Conventional brake means 48 (referenced to the machine frame) may also be conveniently located on the shaft 12 to stop the rotation of the shaft, during certain operations of the invention, as will also be set forth more fully hereinafter.

According to a preferred mode of operating the invention (as a self-energizing torque transmitter or flywheel), the brake 48 is first applied to the shaft 12, rendering it non-rotatable. Electric alternating current is then impressed upon the excitable windings of the outer member to produce an electromagnetic field rotating in a predetermined direction. This direction of rotation of the electromagnetic field will be arbitrarily referred to as being positive. The resulting electromagnetic force induced in the squirrel-cage winding 30 of the inner member 26 develops a torque between the inner member 26 and the outer member 10 which tends to rotate the inner and outer members in opposite directions. However, since the inner member is integrally secured with the temporarily nonrotatable shaft 12, the outer member 10 only is rotatably driven about the shaft 12 and stationary inner member 26. Thus, in this first phase of operation the outer and inner members are analogous to the rotor and stator, respectively, of an induction motor.

The second phase of operation preferably occurs when the outer member 10 has been accelerated to a predetermined optimum velocity, at which time the alternating-current excitation of the excitable windings 14 is cut off, and direct current is impressed simultaneously on the said excitable windings. Concurrent with direct-current excitation of the windings 14, the brake 48 is released to render the shaft 12 rotatable; electromagnetic forces are again induced in the induction windings 30 of the inner member 26, and the magnetic fields of the outer and inner members develop a reluctance torque between the outer and (now-rotatable) inner member 26 to cause the inner member to rotate in the same angular direction as the outer member. By reluctance torque is meant that torque developed between rotating non-synchronous or slipping magnetic fields. This well-recognized phenomenon occurs due to the fact that magnetic objects tend to align themselves in a magnetic field so that the magnetic reluctance is a minimum. In this second phase of operation, the invention, therefore, may be considered analogous to the operation of an electromagnetic clutch. By providing an outer member with predetermined amount of energy at its optimum operating velocity, the torque imparted to the inner member 26 is sufficiently great rotatably to drive the shaft 12 with adequate torque to act upon rated work loads.

It will be seen, therefore, that with the inner member 26 rendered non-rotatable and functioning as the stator of a motor, a positively rotating electromagnetic field induced by alternating current in the windings of the outer member 10 will rotate the outer member in the nature of the rotor of an induction motor. The motoring action between the inner and outer members is continued until the outer member is accelerated to a predetermined optimum maximum velocity. Because of the mass of the outer member 10, once it is accelerated to a working speed, the kinetic energy of the mass is sufficient to do work without further outside assistance. Accordingly, it is then possible to cut off the alternating-current excitation of the outer member windings and to develop reluctance torque between the freely rotating outer member 10 and the rotatable inner member 26, by means of the aforedescribed direct-current induced magnetic fields.

After the inner member 26 is brought up to speed, it may be necessary to slow down or bring the shaft 12 to a full stop at predetermined times. This is accomplished with the preferred embodiment of the invention shown in Figure 3 by cutting off the direct-current excitation of the excitable windings 14 and once again impressing alternating electric current on the windings to reestablish a rotating electromagnetic field in the same positive rotational direction as developed by the first applied alternating current. This field exerts a reverse torque on the inner member 26 from that which was imparted to it by the direct-current electromagnetic fields, decelerates the inner member, and at the same time partially restores the kinetic energy (angular momentum) in the outer member which was dissipated in initially accelerating the inner member, shaft, and associated parts.

It is to be emphasized that this so-called reverse torque between the inner and outer members is actually torque applied in the same rotational direction as that torque which initially accelerated the outer member to operating speed. It is also emphasized that the re-application of alternating current to the outer-member windings is not an application of alternating current in a "plugging" sense, such as is sometimes employed to stop electric motors. The distinction resides in the fact that, in "plugging," the direction of rotation of the alternating-current electrical field must be reversed. In the present invention, the direction of rotation of the alternating-current electrical field is the same in both starting the rotation of the outer member and retarding or stopping rotation of the inner member.

It will readily be appreciated that, as the reverse torque continues to be applied to the inner member 26, its rotational velocity decelerates until the velocity approaches zero. If the torque were to be continued thereafter, the velocity of the inner member 26 and the shaft 12 would pass through zero and then begin to accelerate in a negative rotational direction, i.e., that rotational direction which is opposite to the initial rotation of the parts at the start of the cycle. If it is not desirable that the rotational direction of the inner member 26 and shaft 12 be reversed, the mechanical brake 48 may be applied in sufficient time completely to stop the positive rotation of the shaft before it passes through and negatively beyond the zero-velocity point; speed-responsive means 12′ in Fig. 3 will be understood to be sufficiently suggestive of means for automatically applying brake 48 upon approach to or attainment of zero shaft velocity. With the shaft 12 and inner member 26 brought to a complete stop, the torque between the inner member 26 and the outer member 10 acts on and re-accelerates the outer member, thereby completing the restoration of its kinetic energy which it possessed at the start of the operation, whereby speed-responsive means 12′ may be effective to disconnect brake 48, as will be understood.

Accordingly, if sufficient time is permitted to elapse between sequential operations of a machine, it will be understood that the outer member can be restored to optimum speed before the work-performing, direct-current induced torque is again developed, thereby eliminating the need for an outside source of power to restore outer member energy losses. Suitable program means 49 to accomplish the foregoing and other desired controlled results are set forth in greater detail in my co-pending application, Serial No. 607,024, filed August 30, 1956.

It will also be understood that the dynamic braking action between the inner and outer members 26 and 10 respectively, as set forth hereinabove, may also be utilized to produce a momentary reduction in velocity of the shaft 12 whereinafter the shaft may be brought up to speed once again before finally being brought to a complete stop. The momentary reduction of shaft velocity is accomplished by cutting off the direct current, re-introducing the alternating current for a predetermined brief period and then returning the direct current to the windings. Of course, any period of dynamic braking, no matter how brief, always restores energy (angular momentum) to the outer member 10.

Where the period between operations is short, the flywheel energy-restoring motoring action between the inner member 26 and the outer member 10 may not last for a period of time sufficient to restore all flywheel energy losses. The balance of the energy losses consumed during the work-producing portion of the cycle must, therefore, be replaced by outside means, such as a small motor 46, belt-connected to the outer member 10 by means of V-belts 50. The V-belts 50 will ride in conventional V-belt grooves 42 and 52 provided on the outer peripheries of the outer member 10 and the motor pulley 44. Because of the motoring action of the inner member 26 and the outer member 10, however, the motor 46 may be considerably smaller than that which would normally be required to power a conventional flywheel.

The foregoing discussion has concerned the action of the invention to self-energize itself in a torque-transmitting flywheel function and to engage in dynamic clutching and braking to start, stop and control the velocity of the shaft 12. Yet another function of the invention is to protect the driven machine from overloads which may be structurally destructive to its various parts. The overload-protection function of the invention is provided by controlling the direct current to the windings 14 so that at no time will a torque be transmitted to the rotor 26 in excess of the torque-withstanding strength of the driven machine. It is contemplated that at various periods in the cycle of operation, different portions of a machine may be subjected to excessive stresses. The machine, of course, must be analyzed to determine at what time these stresses are received and upon what parts. Thereafter, the direct current to the windings 14 is varied continuously to control the torque throughout the cycle corresponding with the maximum safe load of the respective loaded members of the machine. It is understood that the current curve will vary depending on the characteristics of each machine, and that the means for controlling the current may be any of several known control systems presently available on the market and understood by those skilled in the art.

It should be further noted that whereas the conventional clutch and brake combinations employed in conjunction with flywheels normally rely upon friction surfaces to produce satisfactory clutching and braking, there is no physical contact between the inner member 26 and the outer member 10 so that there is nothing to wear or adjust. It should also be noted that whereas in conventional braking, the energy required to stop a given machine is dissipated in heat, in the present invention the energy required to stop the rotor is translated into energy to accelerate the flywheel type outer member 26, thereby greatly reducing the heat losses of the system while at the same time conserving the energy of the rotating masses. The entire unit requires no more space than that of an ordinary flywheel, yet it performs the function of a flywheel, a flywheel drive motor, a flywheel clutch and brake unit, a multiple-speed clutch unit, and an overload-protection device.

In the illustrative embodiments of the present disclosure, I employ a standard three-phase line L1, L2, L3 as the source of all operating voltages, and I employ novel control circuits of basically the same nature, whether the instantaneous control demand calls for A.-C. or D.-C. excitation. For any particular electrical phase, the amount of power delivered in an electrical cycle is determined by the controlled fraction of the cycle during which the output circuit to the load is transiently completed. The means whereby this fraction of the cycle is adjustably controlled constitutes an important element of the invention, and in accordance with the invention, an in-phase voltage component and a lagging-phase voltage component are suitably biased and combined to determine closure of the output circuit to the load.

Specifically, in application to a thyratron-operated ignitron for each of the phases of supply to the load, the completion of the circuit to the load is determined by firing the ignitron in response to a signal which fires the thyratron. Considering the anode-cathode voltage on the ignitron as the reference phase (e.g. phase A) for any particular control circuit, my invention contemplates employing a lagging voltage (e.g. lagging 60° behind phase A, as by reversing the polarity of a phase C, or lead-phase, voltage) as the anode-cathode voltage on the thyratron, the grid of which is excited by a suitably biased "turn-on" voltage, which may be an inversion of the reference-phase voltage. Adjusted phase-displacement of both thyratron voltages determines the fractional part of the cycle for power delivery to the load.

This particular phase-shifting circuit will be described after the following general description of circuits directly connected to the torque-transmitting device of Figs. 1–3.

Figure 4:
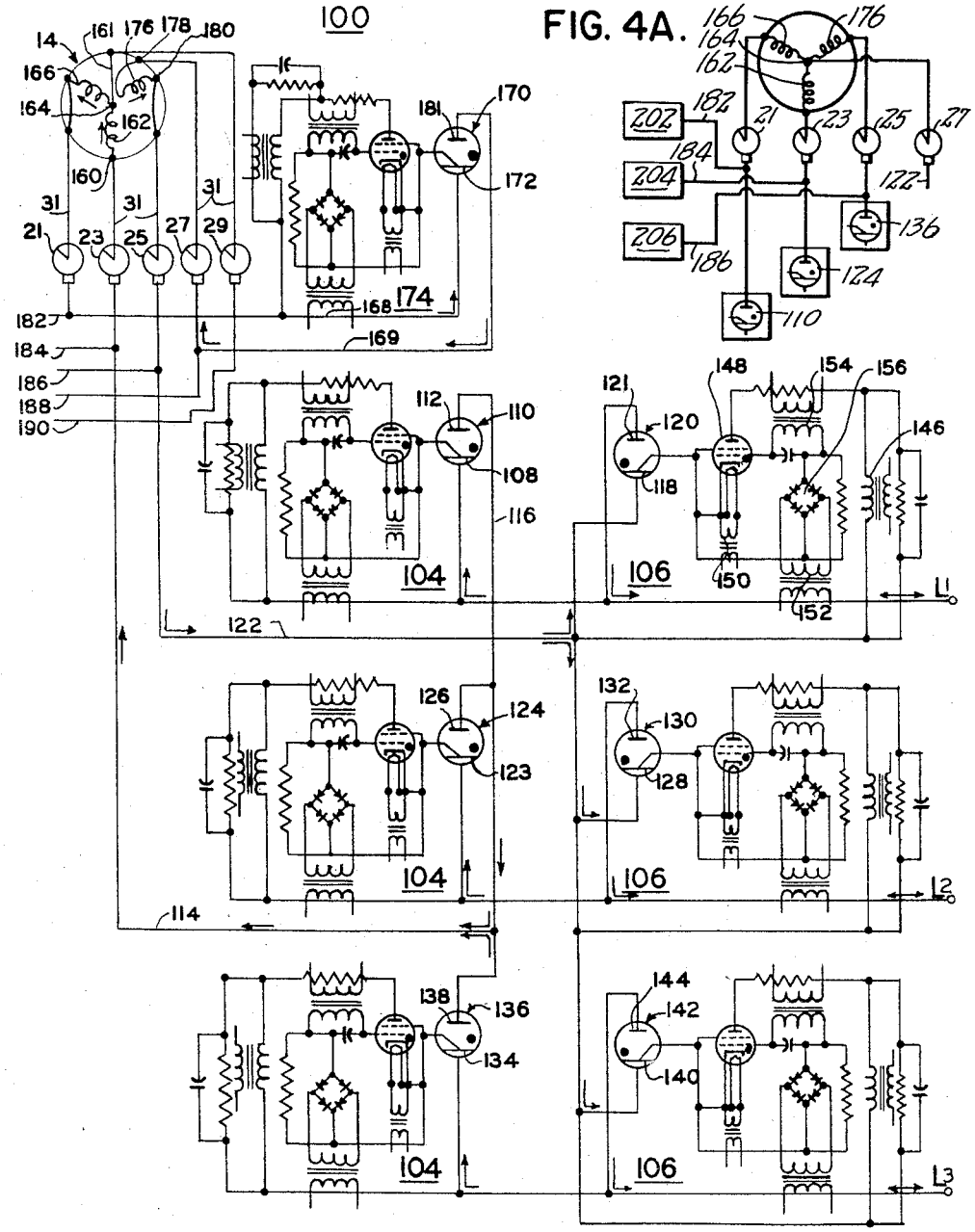
Fig. 4 is a schematic wiring diagram of a preferred embodiment of a circuit employed to energize the torque transmitting mechanism with direct current.

Reference is now made to Fig. 4 which shows the portion 100 of the circuit B (see also Fig. 3) adapted to furnish direct current to the excitable winding 14 when the torque-transmitting mechanism is engaged in clutching action, as determined by program means 49.

This portion of the circuit comprises a system or set of electron transmitting tubes, preferably of the mercury-pool type, such as ignitron tubes or the like, together with associated bias and triggering circuits (to be later described in connection with Figs. 10–14) connected to alternating current lines L1, L2, and L3, in a manner adapted to rectify alternating current to direct current and thereafter to conduct this current to excitable windings 14. Each phase line L1, L2 and L3, respectively, has preferably a pair of ignitron-tube circuits 104 and 106 connected to it, such that the one ignitron-tube circuit will permit a flow of electricity during the positive phase of current flow in the phase line, and such that the other ignitron-tube circuit will permit a flow of current during the negative phase of current flow in each phase line. In this way, the consecutive positive phases of current flow in phase lines L1, L2 and L3 are transmitted consecutively to the excitable windings 14 of the torque-transmitting mechanism, and consecutive negative phases of current are permitted to flow out of the excitable windings, the end result being a supply of direct (full-wave rectified) current to the excitable windings.

Specifically, the cathode 108 of ingnitron tube 110 is connected to phase line L1, and the anode 112 of ignitron tube 110 is connected to a common positive current input lead 114, through connecting lead 116. The cathode 118 of ignitron tube 120 is connected to common negative-current return lead 122, and anode 121 is connected to phase line L1. Since it is a fundamental characteristic of ignitron tubes that they will only permit an electron flow in one direction, it will be seen, as indicated by the arrows on the diagram, that the pair of ignitron tubes 110 and 120 are so connected that ignitron tube 110 will only conduct electricity during the one phase of the flow of current in phase line L1 (arbitrarily designated hereinafter as being positive), and ignitron tube 120 will only conduct electricity during the opposite phase of the flow of electricity in phase line L1 (arbitrarily designated hereinafter as being negative). This follows since the flow of electrons in each ignitron tube is from cathode to anode, and it will be seen that it is the common negative phase return lead 122 which is connected to the cathode of ignitron tube 120, and phase line L1 which is connected to the cathode of ignitron tube 110.

In like manner, the cathode 123 of ignitron tube 124 is connected to phase line L2, the anode 126 of ignitron tube 124 is connected to common positive-current input lead 114, the cathode 128 of ignitron tube 130 is connected to common negative-current return lead 122, and the anode 132 of ignitron tube 130 is connected to phase line L2.

The connections to phase line L3 are also identical to those connections described with respect to phase lines L1 and L2, namely, cathode 134 of ignitron tube 136 is connected to phase line L3, and anode 138 of ignitron tube 136 is connected to common positive-current input lead 114. The cathode 140 of ignitron tube 142 is connected to common negative-current return lead 122, and the anode 144 of ignitron tube 142 is connected to phase line L3.

Thus, it will be seen that the bank of three ignitron tubes 110, 124, and 136, aligned vertically on the left-hand side of Fig. 4, conduct only positive-phase current from phase lines L1, L2 and L3, respectively, to common positive-current input lead 114. In like manner, the bank of vertically aligned ignitron tubes 120, 130, and 142, on the right side of Fig. 4, conduct only negative-phase current from common negative-current return lead 122 to phase lines L1, L2 and L3.

The biasing and triggering circuits for the ignitron tubes are identical in every respect so, for the sake of clarity and brevity, the circuit employed in combination with ignitron tube 120 will be described in detail, it being understood that the remaining biasing and triggering circuits function in exactly the same manner.

The firing of ignitron tube 120 is initiated by triggering-circuit current flow to start ionization of the mercury in the ignitron tube. Energy for this purpose is provided by transformer 146 through switching action of a thyratron tube 148, and transformer 150 provides the necessary heat for the thyratron tube; the primary of transformer 146 is supplied by a voltage which lags the ignitron anode-cathode voltage phase (e.g. transformer 146 for ignitron 120 is supplied by inverted or reversed phase-C voltage, as will later be explained more fully). Transformer 152 and rectifier 156 comprise the biasing means for the thyratron-grid circuit, and transformer 154 supplies the "turn-on" triggering voltage to fire the thyratron tube 148 which, in turn, as aforesaid, ionizes the mercury vapor in the ignitron tube 120. The voltage applied to the primary of transformer 154 may be suitably isolated, adjustably phase-shifted, inverted voltage derived from the reference phase (e.g. phase A, for the case of ignitron 120). Selective phase shift at 154 selectively times the firing action of thyratron tube 148 in each successive work cycle, thereby adjusting the volume of power transmitted for the clutching action of the torque-transmitting mechanism A. The portions shown of transformers 146, 150, 152, and 154 in the biasing and triggering circuits comprise secondary coil portions of the transformers only, it being understood that associated primary coils are necessary for each of the secondary coils in order for these transformers to function; primary connections for transformers 146—154 will be described in connection with Fig. 12.

Figures 1, 2:
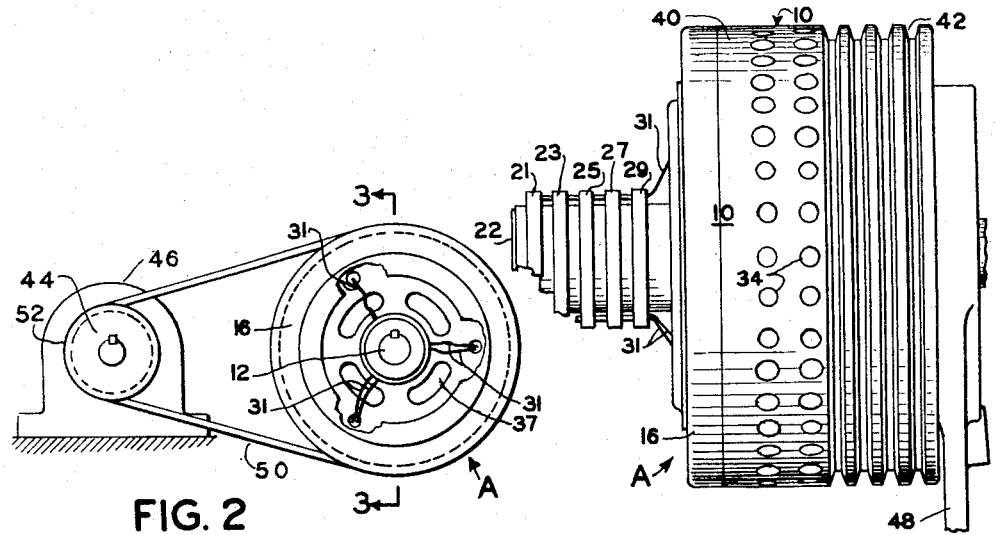
Fig. 1 is an elevational view of a preferred embodiment of the invention.
Fig. 2 is another elevational view of the embodiment of the invention illustrated in Fig. 1, showing a conventional belt-driving connection to an electric-motor prime mover employed in certain applications of the invention.

Referring now to the excitable windings 14 shown in the upper left hand corner of Fig. 4, it will be seen that the five slip rings 21, 23, 25, 27, and 29, otherwise shown in Figs. 1 and 3, are schematically indicated and connected to the excitable windings 14 through leads 31.

Following the path of current through positive-phase common line 114, it will be seen that direct current is received from ignitron tubes 110, 124, and 136 and conducted through slip ring 23 into what will be arbitrarily referred to as the positive side 160 of excitable winding 162. The negative side of winding 162 is connected at a common junction 164 to the positive side of excitable winding 166. The positive side of winding 166 is so designated because it is the side of the winding which receives the current from the winding 162. The negative or exit side of the winding 166 is connected to slip ring 21 which, in turn, is connected by line 168 to ignitron tube 170. Up to this point, it will be seen that direct current is adapted to flow through slip ring 23, windings 162 and 164, respectively, and then return to slip ring 21 from where it is conducted to the cathode 172 of ignitron tube 170. Ignitron tube 170 is connected to its associated biasing and triggering circuit 174 which performs the switching function necessary in rearranging or re-grouping the relationship of the excitable windings 162, 166, and 176 to establish a series circuit through the respective excitable windings and then return to the common negative current return lead 122; for this reason, I term the circuit 174 an ignitron relay.

In this respect, it will be noted that the excitable windings 162, 166, and 176 appear to be of the conventional Y-type connection, common to many three-phase electric motors. However, it is expressly pointed out at this time that the common junction 164 is common only to the negative and positive sides, respectively, of windings 162 and 166, winding 176 not being connected to this common junction 164. It is, therefore, the function of ignitron tube 170 to conduct the current from winding 166 by means of lines 168 and 169 to the positive side 178 of winding 176, whereinafter it is conducted from the negative side 180 of winding 176 through slip ring 25 to the common negative-current return lead 122, so that the flow of current through the excitable windings 14 is in series from winding 162, to winding 166, to winding 176, respectively.

It is also possible to apply direct current effectively in parallel to all three phases of the polyphase windings by use of common incoming direct-current leads or by use of three separate incoming direct-current leads. In both cases, the phase windings would all be connected at the common junction 164, and a return lead connected at the common junction would be used to carry the current away from the excitable windings. Fig. 4A illustrates the latter of these alternatives, wherein positive-phase voltages from the separate-phase ignitrons 110—124—136 are separately applied, via slip rings 21—23—25 to windings 166—162—176, respectively, the negative-phase ignitrons being connected in common, via slip ring 27 to the center point 164 of the Y-connected windings. Alternating-current connections to circuits 202, 204, 206 are as described below in connection with Figure 5.

Figure 5:
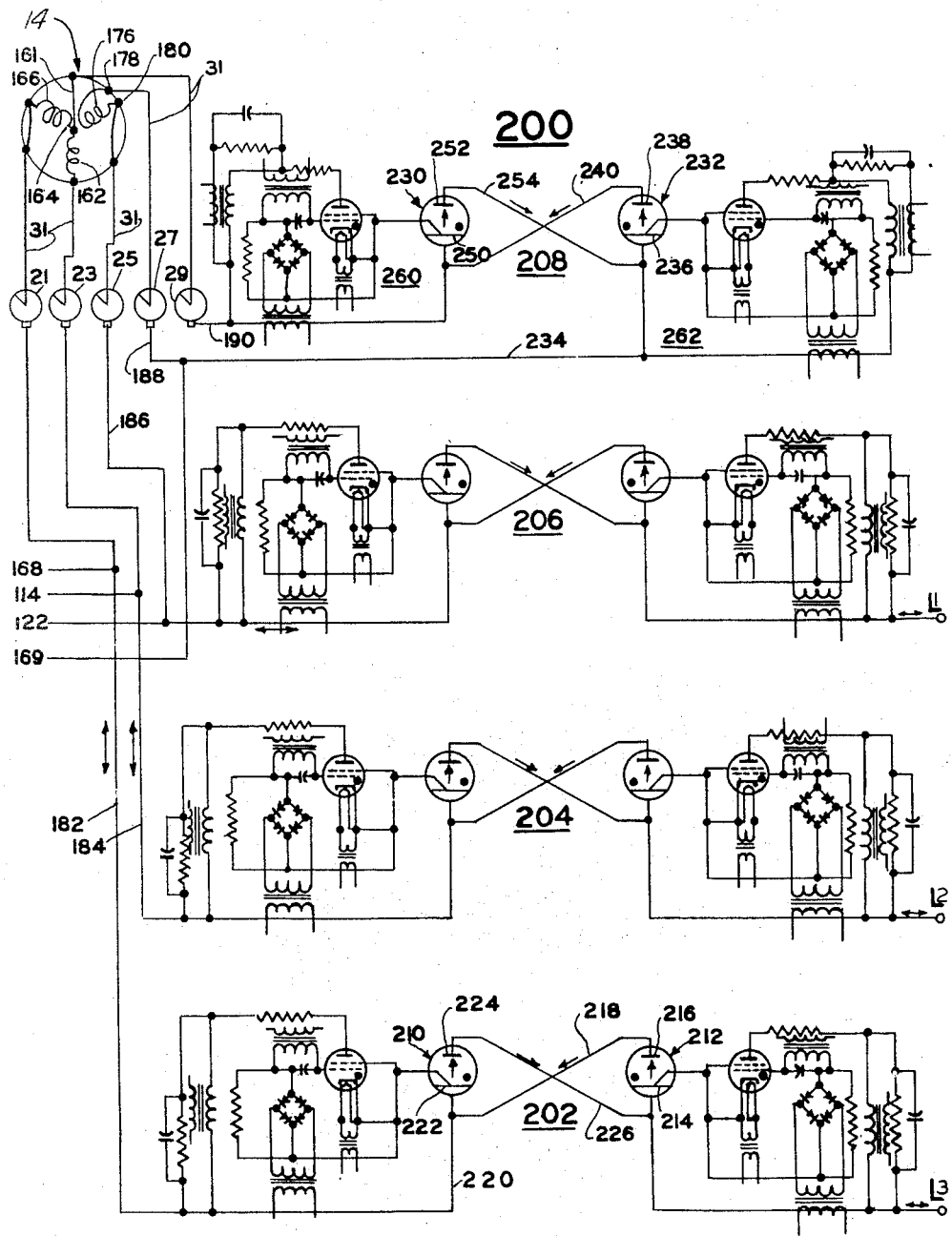
Fig. 5 is a schematic wiring diagram of a preferred embodiment of the circuit employed to energize the torque transmitting mechanism with alternating current.

Lines 182, 184, 186, 188, and 190 are shown appropriately connected to slip rings 21, 23, 25, 27 and 29 in Fig. 4 to indicate how the circuit 200 of Fig. 5 (C, Fig. 3) is connected to the excitable windings 14. The internal connection of the polyphase winding 14 is made to the slip rings by lines 31, also shown in Figs. 2 and 3. Reference will now be made to Fig. 5 for the purpose of discussing the operation of the circuit 200 therein shown, which is adapted to conduct alternating current to the same excitable windings 14 described and shown in Fig. 4. It will be noted that, although no use is made of slip ring 29 in the circuit 100 of Fig. 4 (and as is also shown by connection of lines 168, 114, 122, and 169 in Fig. 5, to slip rings 21, 23, 25, 27), the function of slip ring 29 will be fully understood as the description of circuit 200 progresses.

Starting once more with the alternating-current lines L1, L2, and L3 common to the circuits shown in both Fig. 4 and Fig. 5, and also schematically shown in Fig. 3, it will be seen that here again a pair of ignitron tubes together with their associated biasing and triggering circuits are connected to each alternating-current line. The circuit 200 shown in Fig. 5 illustrates the ignitron-tube arrangement for receiving alternating current from lines L1, L2 and L3 and conducting this current to the excitable windings 162, 166 and 176. Since each set or pair of ignitron tubes associated with each line functions in exactly the same manner as the other pairs of ignitron tubes associated with their respective alternating-current lines, the circuitry of the pair of ignitron tubes 202 will be described in detail, it being understood that this description applies to the circuitry of the pairs of ignitron tubes 204, 206 and 208, respectively.

Each ignitron tube 210 and 212 of the pair of ignitron tubes 202 is adapted to fire alternately, ignitron tube 210 during the positive phase of current flow in line L3, and ignitron tube 212 during the negative phase of current flow in line L3. It will be seen, therefore, that current conducted in L3 during the negative phase of a cycle will be conducted through ignitron tube 212 from cathode 214 to anode 216, and then through cross lead 218 to line 220, line 220 completing the connection from phase line L3 to slip ring 21, via line 182. During the positive phase of the cycle, current will flow from slip ring 21 through lines 182—220 to ignitron tube 210, which will conduct the current from cathode 222 to anode 224, through cross lead 226, and back to line L3. In like manner, alternating current is conducted through lines L1 and L2 to slip rings 25 and 23, respectively.

With the circuit of Fig. 4 inactivated by suitable controls (to be described in connection with Figs. 10–14) associated with the primary coils of the transformers of the biasing and triggering circuits connected to the ignitron tubes of the direct-current circuit 100, alternating current is thus transmitted to the excitable windings 14. In this instance, however, the windings are employed in the standard Y-connection for purposes of alternating-current excitation, e.g. to produce braking and, optionally, for motoring action between the respective outer and inner members 10 and 26 of the torque-transmitting mechanism. However, because of the lack of a common connection between winding 176 and winding 162 and 166 at common junction 164, a switching circuit 208 comprising a pair of ignitron tubes 230 and 232 is connected to phase winding 176 enabling it to function in a normal Y-connected manner. As with the case of circuit 174 of Fig. 4, the circuit 208 of Fig. 5 may be termed an ignitron relay.

For purposes of illustration, if we assume a phase condition in which the current in winding 176 is positive, and the current in winding 162 and 166 is negative, then the current may be considered to flow through slip ring 25 into the one side 180 of the winding 176, and out the opposite side 178 to slip ring 27. Current is then conducted from slip ring 27, through lead 188 to the cathode 236 of ignitron tube 232, across to anode 238, and through cross lead 240 to line 190, which is connected to slip ring 29. Slip ring 29 is connected by line 31 to common junction 164, which then diverts the current through windings 162 and 166 for return by means of slip rings 21 and 23 to lines 182 and 184, ignitron tube sets 202 and 204, and lines L3 and L2, respectively.

Further assuming an instant when the current in winding 162 is positive and the current in windings 166 and 176 is negative, then it will be seen that a portion of the current from winding 162 is diverted through winding 166, and the remaining portion passes through line 161 connected to common junction 164 and to slip ring 29. From slip ring 29, the current is conducted to the cathode 250 of ignitron tube 230, across to the anode 252, cross lead 254, and then returned through line 234 to slip ring 27. The current is then conducted through winding 176 and out through slip ring 25. Thus, it will be seen that line 184, at this phase, is positive, whereas lines 182 and 186 are negative.

When the current in winding 166 is positive, and that in windings 162 and 176 is negative, the cycle is similar to that described above with the exception that the sign of lines 182 and 184 is reversed, line 182 being positive and lines 134 and 186 being negative.

Figure 6:
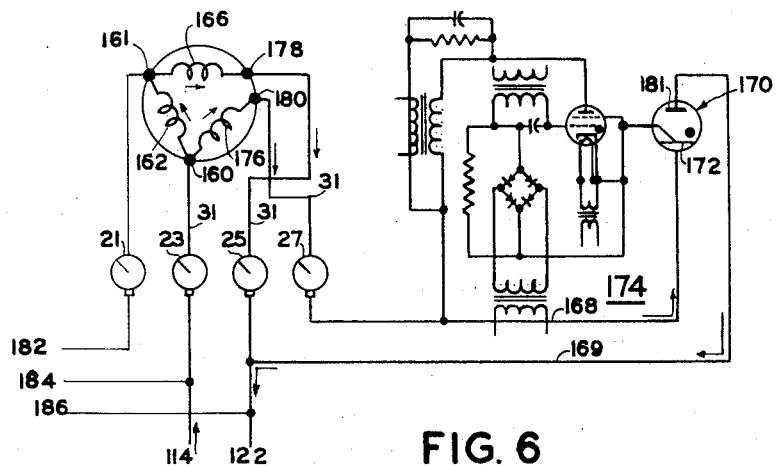
Fig. 6 is a schematic wiring diagram of a preferred embodiment of a circuit employed to energize the torque transmitting device with parallel connected direct current.

Reference is now made to Fig. 6 in which is shown another preferred grouping of excitable windings 14 employed in combination with portion 100 of circuit B (see Fig. 4) adapted to furnish direct current to the windings 14, e.g. for clutching action.

With this grouping, resembling an open delta connection, only three collector rings are required, namely, 23, 25 and 27. Collector ring 23 receives direct current from common positive-current input lead 114, which is transmitted by a short lead 31 to a common junction or apex 160 of windings 162 and 176. Windings 162 and 166 are joined at apex 161. The end 178 of winding 166 is connected to collector ring 25, which in turn is connected to common negative-current return lead 122. End 180 of winding 176 is connected to collector ring 27, to which is secured lead 168 for making connection between the collector ring 27 and cathode 172 of ignitron tube 170. The circuit through the ignitron tube 170 is completed with lead 169 connecting anode 181 to common negative-current lead 122.

Direct current delivered through collector ring 23 to apex 160 flows in series through windings 162 and 166, and then returns to common negative lead 122. Current also flows from apex 160 through windings 176 and ignitron tube 170 in parallel to windings 162 and 166, and then returns to common negative lead 122.

Figure 7:
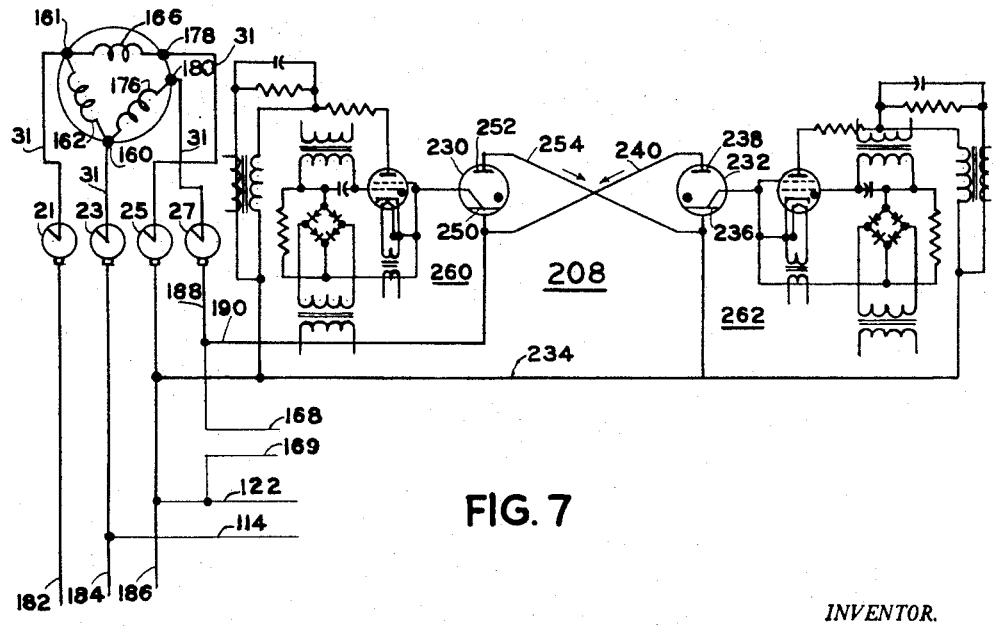
Fig. 7 is a schematic wiring diagram of another preferred embodiment of a circuit employed to energize the torque transmitting device with alternating current.

The windings 14 shown in Fig. 6 may also be regrouped as shown in Fig. 7 to provide alternating-current excitation, e.g. for braking the mechanism. Four collector rings are used for this grouping of the windings, namely, rings 21, 23, 25, and 27. Alternating-current lines 182, 184 and 186 are connected to collector rings 21, 23 and 25, respectively. Collector ring 21 is connected to apex 161, the junction between windings 162 and 166; ring 23 is connected to apex 160, the junction between windings 162 and 176; and ring 25 is connected to the end 178 of winding 166. The end 180 of winding 176 is connected through ring 27 and lines 188 and 190 to the cathode 250 of ignitron tube 230, and to the anode 238 of ignitron tube 232. The cathode 236 of ignitron tube 232 and anode 252 of ignitron tube 250 are connected through line 234 to line 186.

The switching or grouping circuits 260 and 262 thus function to conduct alternating current between points 178 and 180 of windings 166 and 176, respectively, in order to group windings 162, 166 and 176 to complete a so-called delta hook-up similar to delta-wound three-phase electric motors.

Figure 8:
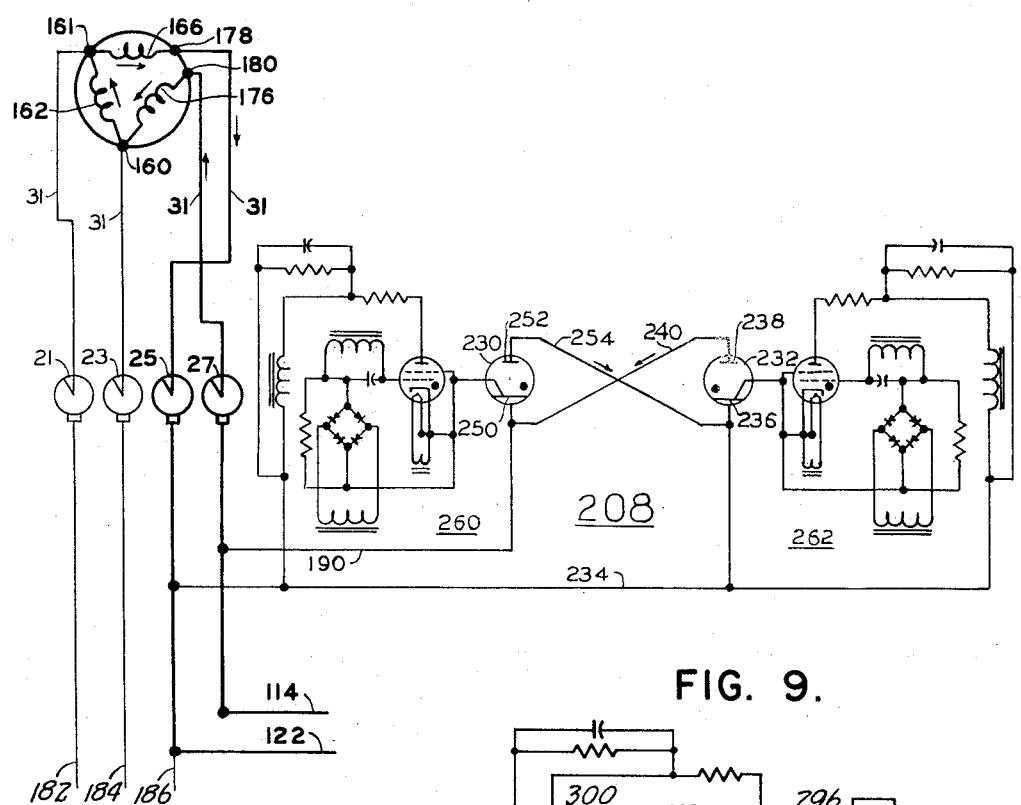
Fig. 8 is a schematic wiring diagram of yet another preferred embodiment of a circuit employed to energize the torque transmitting device with series-connected direct current.

In certain applications, it is possible to dispense with ignitron 170 and its associated triggering circuit 174 shown in Fig. 6, and to connect the delta winding in series for direct current application thereto as is best shown in Fig. 8. Here it will be seen that direct current lines 114 and 122 are connected to rings 27 and 25, respectively, direct-current excitation being emphasized by heavy lines 114—122 and their connection to the windings in series. Thus, direct current will flow from line 114 through coils 176, 162 and 166 sequentially and then return through line 122. It will be observed that the alternating-current connections to rings 21, 23, 25, 27 remain the same, and the means for alternating-current excitation of the delta winding remains as described in connection with Fig. 7. The flux density of the magnetic field is somewhat less in the direct-current excitation of the delta winding of Fig. 8 than is obtainable in the circuitry shown in Fig. 6; however it has been found that this excitation is sufficient for many applications of the subject invention. As a matter of fact, even when series connected, the direct-current excitation of the delta winding produces a torque considerably in excess of the torque developed by the alternating-current excitation of the same delta winding.

Figure 9:
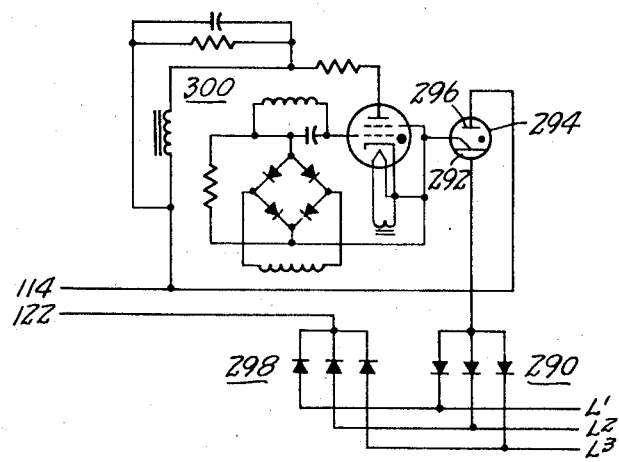
Fig. 9 is a wiring diagram schematically showing another form of excitation circuit for direct-current excitation of the torque-transmitting device.

Fig. 9 illustrates an alternative controlled source of direct current, full-wave rectified from the lines L1, L2, L3, for supply in lines 114—122, which may be otherwise as described in Fig. 4, i.e. for direct connection to slip rings 23—25, respectively; the circuit of Fig. 9 may thus be viewed as an alternative for that part of Fig. 4 which is identified by the three ignitron circuits 104 and by the three other ignitron circuits 106. In Fig. 9, a first bank of dry rectifiers 290 (as, for example, silicon diodes) is connected in common to line 114, via a single ignitron control circuit 300, and is poled to carry return current to the respective lines L1, L2, L3. A second similar bank 298 is connected in common to the line 122, the rectifiers 298 being poled to serve current flowing from the lines L1, L2, L3 to the excitable windings 14.

In Fig. 13, I show an important part of my general organization for the processing of control signals to achieve selective clutch and brake operations with the device of Fig. 3, and with the various control circuits of Figs. 4 to 9. As indicated generally above, the device operates from a three-phase source of voltage, and phase-shifting is employed as an important element of the control. In the form shown, phase-shifted signals are developed by two separate three-phase synchro generators or control transformers which, in Fig. 13, are identified as the clutch synchro generator 330 and the brake synchro generator 331. Broadly speaking, the generators 330—331 are differentially connected to a servomotor 332 which is driven in a first direction by signal-processing means including an amplifier 334, and in the opposite direction by similar circuitry including an amplifier 335 (see Fig. 13).

Amplifier 334 operates on clutch-control signals developed by means not shown and not necessary to the present description. For present purposes, it suffices to indicate that such signals are present in a control circuit 336 incorporating means whereby a feedback (shown schematically as a mechanical connection 330′ from the clutch synchro generator shaft) may precisely govern the phase shift or rotor displacement in the clutch synchro generator 330. As will later be explained more fully, the extent of displacement of the clutch synchro generator 330 directly determines the power delivered to the load when clutching action is desired. In a generally similar manner, brake-control signals determine the function of amplifier 335 and, therefore, the shaft positioning or phase shift developed in the brake synchro generator 331.

In the form shown, further control of phase shift (i.e. rotation of motor 332) is achieved by a tachometer generator 338 following rotation of the flywheel 10 to apply a polarized feedback signal to the brake synchro control circuit, so that as the desired maximum flywheel speed is approached and attained, the negative torque developed by reason of braking action may be suitably reduced and finally cut off. In a similar manner, a second tachometer generator 339 follows the output of shaft 12 and applies to the amplifier 334 a polarized control voltage such that, as the desired output speed is approached and attained, clutch coupling is reduced and cut off. Various means may be employed whereby the regulating functions of the feedback circuits 338—339 may be varied not only as a function of time, but also as a function of the desired programming for or actual operation of the particular machine being operated by the prime mover of Fig. 1. Such specific machine-controlled functions form no part of the present invention and are therefore not discussed further in this specification.

In Fig. 10, I show in greater detail the particular mechanical organization of clutch and brake synchro generators 330—331 and servomotor 332 which I have found to be eminently satisfactory in operation. The motor 332 may be of the so-called stalled-torque variety, meaning that it may be excited to deliver selected positive and negative torques, while stalled. With torque of one polarity, the motor shaft 340 drives (i.e. angularly shifts) say, the clutch synchro generator 330, and with torque of opposite polarity, the motor shaft 340 drives (i.e. angularly shifts) the brake synchro generator 331. In the form shown, springs 341—342 serve to reposition both synchro generators 330—331 to a neutral or mid-position in which no phase shift is produced in either one of the generators 330—331. Preferably, the coupling of shaft 340 to each of the generators 330—331 incorporates a lost motion in each case so that, whenever shaft 340 is effective to rotate the synchro 330 (one direction away from the mid-position), it is ineffective to rotate the synchro 331. By the same token, rotation of synchro 331 (in the other direction away from the mid-position) involves no rotation of synchro 330.

In the form shown, the zero phase-shift position for synchro 330 is determined by a stop pin 343, fixed to the frame of synchro 330 and determining the limit to which spring 341 can urge an arm 344 on the shaft of the synchro generator 330. The arm 344 supports an elongated pin 345 which may be intercepted by the drive arm 346 carried by the motor shaft 340. Thus, whenever the clutch synchro generator 330 is to be rotated by motor 340, arm 346 will engage pin 345 to relieve arm 344 from the stop 343. The more the displacement of arm 344 (clockwise in the sense of Fig. 11), the more the opposing torque developed by spring 341, and a given phase shift occasioned by rotation of the synchro generator 330 will be achieved when the instantaneous torque developed by motor 332 equals the opposing torque developed by spring 341. Of course, when motor 332 is deenergized, spring 341 returns the synchro generator 330 to the zero phase-shift position.

In a similar manner, and for positions of shaft 340 on the opposite angular side of the reference position determined by spring return to the stop pin 343, the shaft 340 serves to adjustably determine phase shift in the braking synchro generator 331. The parts which actuate generator 331 are analogous to those described for generator 330 and have therefore been given the same reference numerals, with primed notations. Thus, a given braking excitation will determined by the amount of phase shift (and, therefore, the extent of rotation) of the braking synchro generator 331. This will occur when the torque delivered by the motor 332 equals the opposing torque developed by spring 342, and of course when the motor 332 is deenergized, spring 342 will return the motor shaft 340 and the rotor of synchro generator 331 to the intermediate or neutral position.

The diagram of Fig. 12 illustrates the internal organization of one of the synchro generators 330—331, and since particular emphasis herein is on clutching, the diagram of Fig. 12 may be viewed as illustrating the windings of synchro generator 330. Generator 330 comprises a rotor having three-phase windings 350—351—352, supplied by slip rings connected at 350'—351'—352' to a three-phase source; the windings 350—351—352 happen to be shown Y-connected. For convenience in the present description, the phase of excitation of winding 350 will be termed the A phase, the phase at winding 351 will be termed the B phase, and the phase at winding 352 will be termed the C phase.

The stator or secondary windings 353—354—355 of generator 330 have orientations corresponding to the primary or rotor windings 350—351—352, but are disconnected, so that no Y-connection is provided. By disconnecting the secondaries or stationary windings 353—354—355, the voltages induced therein can be kept as independent as possible, thereby materially reducing the extent to which transient voltages in one phase are induced in another phase, and eliminating circulating transients in the secondary phases.

The output voltages of the synchro generator or control transformer incorporate selected phase shifts, reflecting the instantaneous angular displacement of the generator shaft 347 with respect to the stator; for the secondary winding 353, the selectively shifted A-phase voltage is available by means of a transformer coupling element 357, the secondary or output circuit of transformer 357 being omitted in Fig. 12. In a similar manner, separate phase-shifted voltage for the B-phase (secondary winding 354) is available at transformer output 359, and separate phase-shifted voltage for the C-phase (winding 355) is available at transformer output 361. At any one instant, i.e., for any given shaft displacement for the synchro generator of Fig. 12, the same phase shift will have been developed in the A, B, and C phases, at outputs 357—358, 359—360, and 361—362, respectively.

My basic power delivery or control circuit has been described in connection with the circuit 106 for ignitron 120 in Fig. 4, and the overall layout of Fig. 4 illustrates utilization of similar circuits (i.e. circuits 104 and remaining circuits 106) in multiple for controlling power delivered to the load 162—166—176 to effect clutching action, meaning development of positive torque in the output shaft 12. As explained above, each thyratron operates with an anode voltage lagging by substantially 60° the corresponding ignitron voltage, and with a reference-phase voltage on the thyratron grid; both of these thyratron voltages are preferably phase-shifted in unison. In the case of thyratron 148 for ignitron 120, this can mean anode voltage developed in transformer secondary 146 from the inverted lead phase (i.e. phase C, reversed), in which event winding 146 will be understood to be the secondary of a transformer having a primary winding 362 connected to the phase-shifted phase-C voltage (see Fig. 12). The "turn-on" voltage is phase-shifted from the reference phase and, therefore, winding 154 (Fig. 4) may be viewed as the secondary of the transformer whose primary 357 (Fig. 12) is connected across the phase-A secondary winding 353 of the phase-shift synchro generator 330. In like manner, thyratron-anode supply for the circuit of B-phase ignitron 130 may be taken from transformer primary 358 (A phase, Fig. 12), and "turn-on" voltage from transformer primary 359. Also, thyratron-anode supply for the circuit of C-phase ignitron 142 may be taken from transformer primary 360 (B phase), and "turn-on" voltage from transformer primary 361. Similar connections of opposite polarity will be understood to be made for thyratron-anode supply and "turn-on" voltage for the trigger circuits of ignitrons 110—124—136.

Operation of the firing circuit for ignitron 120 will be understood from the simplified voltage-time curves of Fig. 14, in which the plot labelled a depicts certain of the principal voltages, the solid curve representing two complete cycles of the A-phase (reference-phase) voltage applied across the anode-cathode circuit 121—118 of ignitron 120. The necessary lagging voltage for exciting the anode circuit of thyratron 148 is shown derived from the lead or phase-C voltage (heavy dashed curve), after inversion or reversal (light dashed curve 370).

Plot b of Fig. 14 illustrates the condition of zero phase shift, meaning that the circuit 106 for ignitron 120 is not caused to fire. The firing threshold for thyratron 148 is depicted as occurring when the biased turn-on voltage 371 (reversed phase-A voltage) has risen sufficiently to enable thyratron 148 to fire, but in plot b this occurs at the time when the ignitron-anode voltage begins to go through zero and negative, thereby preventing any firing of the ignitron 120.

Plot c illustrates the condition of 30° phase shift, meaning that both the thyratron-anode voltage 370 and the thyratron grid voltage 371 have been shifted to this extent (in the advancing direction). Since the firing threshold for the thyratron now occurs before the ignitron loses its ability to fire, a short firing time is determined, meaning a relatively low level of controlled power to the load. The shaded bar 372 suggests the power-delivery fraction of the cycle, and the phase-shifted voltages are identified with primed notation (370'—371').

Increasing levels of power delivery are depicted in plots d and e, for the cases of 60° and 90° phase shift, respectively. Phase-shifted voltages are depicted with double-primed and triple-primed notations (370"—371", and 370'"—371'", respectively), and shaded bars 373—374 suggest the resulting controlled power-delivery fraction of the cycle.

As indicated generally above, the D.-C. ignitron relays 174 (or 300) and the A.-C. ignitron relays 208 (260 and 262) may be of the same component construction as the various control circuits 104—106. This is also, generally speaking, true of the control voltages to be supplied to these relays. For D.-C. operation, relays 174 or 300 may be "turned-on" all the time (e.g. as long as any clutching action is called for) and therefore the phase-shifted anode and grid voltages for the thyratron of circuit 174 may be derived by parallel connection of the outputs of transformer secondaries for all three phases of synchro secondary output, as discussed in my copending application Serial No. 640,273, filed February 14, 1957.

In summary, therefore, it will be understood that by appropriately switching by means of primary-transformer coil controls from the circuits of either Fig. 4 or Fig. 6 to the circuits of either Fig. 5 or Fig. 7, respectively, and vice versa, both direct current and alternating current can be supplied to the excitable windings 14 from a common alternating source of current, lines L1, L2, and L3. By selectively activating and deactivating the circuits of Figs. 4 and 6, and 5 and 7, the excitable windings 14 are switched from a clutching connection to a braking connection, and vice versa, by means of switching circuits comprising ignitron tube 170 and its biasing and switching circuit 174, and the pair of ignitron tubes 230 and 232 with their associated biasing and switching circuits 260 and 262. Furthermore, the controlled delivery of power is smooth, without sudden transitions, as the level of control varies, and regardless of whether clutching or braking functions are demanded.

This electronic control of the current in the excitable windings 14 permits current regulation of an exceedingly high order, thereby permitting machine control which has heretofore been unobtainable with ordinary control means, particularly when recognition is taken of the universal application of this torque-transmitting device set forth and described in the preceding portions of this application.

Throughout this specification "clutching" has been identified with positive output-torque development and "braking" has been identified with negative output-torque development; this will be understood to have been purely for purposes of simplifying the discussion, inasmuch as the principal emphasis herein has been on control circuits, and since these control circuits may be flexibly employed to provide a variety of drive programs for the output shaft 12 (or inner rotational element 26), all as discussed at greater length in said copending application. For example, upon "motoring" (A.-C. excitation) for a period of time more than sufficient to "brake" the inner element 26 to zero speed, or upon "motoring" commencing with the inner element 26 at zero speed, negative output rotation (i.e. output rotation opposite to the direction of flywheel rotation) will be developed; actually, this is just as much a clutching action as if the windings had been D.-C. excited, the only difference being the direction of output revolutions. By the same token, having developed negative output rotation through "motoring" action (A.-C. excitation), the negative output rotation can be "braked" with reference to the flywheel by D.-C. exciting the windings; if the D.-C. excitation is maintained, the output shaft 12 will be brought back first to zero speed (with reference to the frame), with subsequent development of positive rotation in the output shaft. Thus, both A.-C. and D.-C. excitation of the winding means can be caused to develop "breaking" and "clutching" action as desired, the only difference being in sign of torque developed in the output shaft 12.

It will be appreciated that I have described a novel and ingenious control means having particularly useful application in prime movers or torque-transmitting devices of the character discussed generally in connection with Figs. 1–3. It is particularly significant that with control circuits of the type discussed at 106, it is possible to achieve reliably defined fine increments of power delivered to the load, whether the load be such as to deliver positive torque or negative torque in the output shaft 12, and more or less regardless of the torque demanded. In the particular application which I have made of my invention, I have employed a relatively high-torque low-inertia servomotor at 332 and have been able to transfer from full clutching torque (meaning full displacement of the clutch synchro generator 330) to full braking torque (meaning full displacement of the brake synchro generator 331) in a matter of 100ths of a second; I have also been able to "jog" a heavy output load, such as the ram of an 80-ton power press, with rapid alternation between lesser levels of clutching and braking torque. The resulting interphase transients have not been such as to disturb the proper firing control in either the clutching circuits of Fig. 4 or the braking circuits of Fig. 5.

Insofar as prime movers of the character indicated are concerned, it is particularly important that the energy of the system can be conserved, by reacting between relatively moving parts of the prime mover and its load (i.e. the machine on which operations are being performed), there being no need to dissipate energy by braking with reference to the frame or by accelerating with reference to the frame, except as necessary to effect minor adjustments in speed. The substantial amount of braking effort is achieved through motoring action which serves the dual purpose of braking the output shaft 12 and of reaccelerating the flywheel 10 substantially to the desired speed.

While I have described the invention in detail for the preferred forms illustrated, it will be understood that modifications may be made within the scope of the invention as defined in the claims which follow.

I claim:

1. In an electromagnetic clutch having a pair of concentric rotatable members mounted on a drive shaft, one of said members being idly mounted thereon and the other member being rigidly secured thereto, excitable windings in one member and induction windings in the other member, the improvement in means to energize the said excitable windings comprising: a direct-current circuit including a source of alternating current; power lines to conduct said current; first current-conducting means comprising first pairs of electron-discharge devices connected to each power line; each device of each pair of electron-discharge devices being adapted to fire alternately as the phase of current reverses, thereby to give full-wave rectification; means to connect said first pairs of devices to said excitable windings for clutching action; an alternating-current circuit including second current-conducting means comprising second pairs of electron-discharge devices connected to each of said power lines; each device of said second-mentioned electron-discharge devices being adapted to fire alternatively as the phase of current reverses, thereby to permit alternating-current oscillation in said power lines; means to connect said second pairs of devices to said excitable windings; and means to selectively energize said first or second pairs of devices respectively in accordance with a predetermined pattern, whereby said excitable windings have selectively impressed thereon alternating-current or direct-current excitation to control torque between said pair of concentric rotatable members.

2. In an electromagnetic clutch having a pair of concentric rotatable members mounted for independent rotation on a common axis, and winding means coacting between said members, the improvement in means to energize the said winding means comprising: a direct-current circuit including a source of alternating current; first current-conducting means comprising a pair of electron-discharge devices connected to said source; each device of each pair of electron-discharge devices being adapted to fire alternately as the phase of current reverses, thereby to give full-wave rectification; leads connecting said discharge devices to said winding means; an alternating-current circuit including second current-conducting means comprising a pair of electron-discharge devices connected to said source; each device of said second mentioned pair of electron-discharge devices being adapted to fire alternatively as the phase of current reverses, thereby to permit the supply of alternating-current oscillation by said second current-conducting means; leads connecting the discharge devices of said second current-conducting means for alternating-current excitation of said winding means; and means to selectively energize said first or second mentioned pairs of devices respectively in accordance with a predetermined pattern, whereby said winding means have selectively impressed thereon alternating-current or direct-current excitation to control torque between said pair of concentric rotatable members.

3. The device set forth in claim 2, including bias and triggering circuits connected to each of said electron-discharge devices, and a source of power to energize said bias and triggering circuits.

4. In an electromagnetic clutch having a pair of concentric rotatable members mounted for independent rotation on a common axis, and winding means coacting between said members, said winding means including plural windings on one of said members, the improvement in means to energize the said windings comprising: a direct-current circuit including a source of polyphase current; a separate power line for each phase; first current-conducting means comprising a pair of electron-discharge devices connected to each phase line; each device of each pair of electron-discharge devices being adapted to conduct current alternately as the phase of current reverses, thereby to give full-wave rectification; leads connecting the positive-phase conducting tubes to a common positive lead; leads connecting the negative-phase conducting tubes to a common negative lead, said positive lead being connected to the positive side of one of the windings of said one member, said negative lead being connected to the negative side of one of the windings of said one member, and means to selectively group said excitable windings for clutching; an alternating-current circuit including second current conducting means comprising a pair of electron-discharge devices connected to each of said phase lines; each device of each pair of electron-discharge devices being adapted to alternatively conduct current as the phase of current reverses, thereby to permit alternating-current oscillation in each phase line; a separate line connecting each positive conducting tube to a corresponding winding of said one member; a separate line connecting each negative conducting tube to said corresponding winding of said one member; means to selectively group said phase windings for braking; and means to selectively energize said first or second mentioned pairs of devices respectively in accordance with a predetermined pattern, whereby said windings have selectively impressed thereon alternating-current or direct-current excitation to control torque between said pair of concentric rotatable members.

5. The device set forth in claim 4, wherein said means to group said windings comprises means to selectively series-connect said windings for clutching when said first mentioned pairs of devices are conducting current; and means to Y-connect said windings for braking when said second mentioned pairs of devices are conducting current.

6. The device set forth in claim 4, wherein said means to group said windings comprises means to selectively connect said windings in parallel for clutching when said first-mentioned pairs of devices are conducting current; and means to delta-connect said windings for braking when said second-mentioned pairs of devices are conducting current.

7. The device set forth in claim 4, wherein said means to selectively group said windings for clutching comprises an electron-discharge device, a bias and triggering circuit adapted to actuate said device, and leads connecting said device to the circuit of said windings, whereby said windings are connected through said device to conduct direct current therethrough in predetermined sequence.

8. The device set forth in claim 4, wherein said means to selectively group said windings for braking comprises a relay including a pair of electron-discharge devices, said relay being adapted to alternatively conduct current as the phase of current reverses; a bias and triggering circuit adapted to actuate each of the electron-discharge devices of said relay; and leads connecting said relay to the circuit of said windings, whereby said windings are alternately connected through said respective relay devices to conduct alternating current therethrough in predetermined sequence.

9. The device set forth in claim 4, wherein said means to selectively energize said electron-discharge devices comprises a bias and triggering circuit connected to each device, and a source of power to energize each bias and triggering circuit.

10. The device set forth in claim 4, wherein said current-conducting means comprises pairs of ignitron tubes associated with each phase line.

11. The device set forth in claim 4, wherein said first current-conducting means comprises a rectifier connected to each phase line.

12. In an electromagnetic clutch including a pair of rotatable members mounted for independent rotation on a common axis, and winding means coacting between said members, the improvement in means to energize the said winding means comprising: a direct-current circuit including a source of polyphase current; a separate phase line for each phase; current-conducting means comprising a pair of ignitron tubes connected to each phase line; a triggering circuit connected to each ignitron tube; each ignitron tube of said pairs of ignitrons being adapted to fire alternately as the phase of current reverses, thereby to give full-wave rectification; leads connecting said ignitron tubes to said winding means for direct-current excitation of said winding means; an alternating-current circuit including second current-conducting means comprising a pair of ignitron tubes connected to each of said phase lines; a triggering circuit connected to each ignitron tube of said second current-conducting means; the ignitron tubes of each pair of ignitron tubes being adapted to fire alternately as the phase of current reverses, thereby to supply alternating current via said second current-conducting means; leads connecting the ignitrons of said second current-conducting means for alternating-current excitation of said winding means; and control means to selectively energize the triggering circuits of said first or second mentioned ignitron tubes respectively in accordance with a predetermined pattern, whereby said winding means have selectively impressed thereon alternating-current or direct-current excitation to control torque between said pair of concentric rotatable members.

13. The device set forth in claim 12, wherein said control means comprises means to selectively series-connect windings of said winding means when said first-mentioned pairs of tubes are conducting current; and means to Y-connect windings of said winding means when said second-mentioned pairs of tubes are conducting current.

14. The device of claim 13, in which said control means includes separate ignitron relays for said series connection and for said Y-connection, respectively.

15. The device set forth in claim 12, wherein said control means comprises means to selectively connect windings of said winding means in parallel when said first-mentioned pairs of tubes are conducting current; and means to delta-connect windings of said winding means when said second-mentioned pairs of tubes are conducting current.

16. The device of claim 15, in which said control means includes separate ignitron relays for said parallel connection and for said delta-connection, respectively.

17. In an electromagnetic clutch including a pair of rotatable members mounted for independent rotation on a common axis, and winding means coacting between said members, the improvement in means to energize said winding means comprising: a source of polyphase current including a separate phase line for each phase; direct-current conducting means including separate ignitron-tube means connected to each phase line; a triggering circuit for each ignitron-tube means, and said respective ignitron-tube means being connected to supply rectified current; leads connecting said ignitron-tube means to said winding means for direct-current excitation of said winding means; alternating-current conducting means including separate ignitron-tube means connected to each phase line; a triggering circuit for each ignitron-tube means of said alternating-current conducting means, and said last-mentioned ignitron-tube means being connected to supply alternating current; leads connecting said last-mentioned ignitron-tube means to said winding means for alternating-current excitation of said winding means; and control means to selectively activate the triggering circuits of said first and second-mentioned ignitron-tube means respectively in accordance with a predetermined pattern, whereby said winding means have selectively impressed thereon alternating-current or direct-current excitation to control torque between said pair of concentric rotatable members.

18. In an electromagnetic clutch having a pair of rotatable members mounted for independent rotation on a common axis, winding means coacting between said members, said winding means including a plurality of windings on one of said members, the improvement in means for energizing said winding means comprising: a source of polyphase current including a separate line for each phase; direct-current-conducting means comprising a separate rectifier means connected to each phase line; leads connecting the positive poles of said rectifier means to a common positive lead; leads connecting the negative poles of said rectifier means to a common negative lead, said positive lead being connected to the positive side of one of said windings, said negative lead being connected to the negative side of one of said windings; alternating-current conducting means comprising a pair of electron-discharge devices connected to each of said windings; each device of each pair of discharge devices being adapted to alternately conduct current as the phase of current reverses thereby to permit alternating current oscillation in each phase line; and means to selectively energize said rectifier means or said discharge devices respectively in accordance with a predetermined pattern, whereby said excitable winding means have selectively impressed thereon alternating-current or direct-current excitation to control torque between said pair of concentric rotatable members.

19. The device set forth in claim 18, wherein said winding means are series-connected to said common positive and negative leads when said rectifier means is energized.

20. The device set forth in claim 18, wherein said winding means includes first, second, and third windings, said common positive lead being connected to the positive side of the first winding, the second winding being connected between the negative side of said first winding and the positive side of said third winding, and said common negative lead being connected to the negative side of said third winding.

21. The device set forth in claim 18, wherein said winding means includes first, second, and third windings, said common positive lead being connected to the positive side of the first winding, the second winding being connected between the negative side of said first winding and the positive side of said third winding, said common negative lead being connected to the negative side of said third winding, one of said phase lines being connected to the negative side of said first winding and the positive side of said second winding, a second phase line being connected to the negative side of said second winding, and the positive side of said third winding, a third phase line being connected to the positive side of said first winding, and means to connect the negative side of said third winding to said third phase line, whereby said windings are delta-connected to said phase lines.

22. The device set forth in claim 18, wherein said rectifier means comprises dry rectifiers connected separately to said phase lines.

23. The device set forth in claim 18, wherein said rectifier means comprises a pair of dry rectifiers connected to each of said phase lines and in full-wave-rectifying relation with energy supplied to said winding means.

24. In an electromagnetic clutch including a pair of rotatable members mounted for independent rotation on a common axis, and winding means coacting between said members, the improvement in means to energize said winding means, comprising: a three-phase supply source, three like gaseous-control devices including thyratron control-circuit means connected to ignitron load-circuit means, said devices being for the respective phases of said supply source, each thyratron control-circuit means including input-circuit means and output-circuit means, means associated with each said device and supplying the thyratron output-circuit means thereof with an alternating voltage lagging the ignitron load-circuit voltage, means also associated with each said device and supplying the thyratron input-circuit means thereof with an alternating voltage in substantially inverse-phase relation with the ignitron load-circuit voltage, phase-shifting means in like simultaneous phase-controlling relation with the voltages supplied to all said thyratron input-circuit means for selectively controlling phase-displacement of said thyratron-input voltages relatively to said ignitron load-circuit voltage, and selectively operable connecting means coordinated with operation of said phase-shifting means and effective to make first and second connections of said winding means to said devices, said first connections being effective to develop rotating torque between said members for a first operation of said connecting means and of said phase-shifting means, and said second connections being effective to develop dragging torque between said members for a second operation of said connecting means and of said phase-shifting means.

25. The clutch of claim 24, in which said phase-shifting means is additionally in like phase-controlling relation with the voltages supplied to all said thyratron-output voltages relatively to said ignitron load-circuit voltage.

References Cited in the file of this patent
UNITED STATES PATENTS

| | | |
|---|---|---|
| 2,359,143 | Myers | Sept. 26, 1944 |
| 2,471,505 | Winther | May 31, 1949 |
| 2,759,126 | Bedford | Aug. 14, 1956 |
| 2,806,967 | Eck | Sept. 17, 1957 |